Sept. 9, 1969 JEAN-PIERRE L. R. HARIVEL Re. 26,660
SEALED ALKALINE CELLS AND ELECTROLYTES THEREFOR
Original Filed July 7, 1964
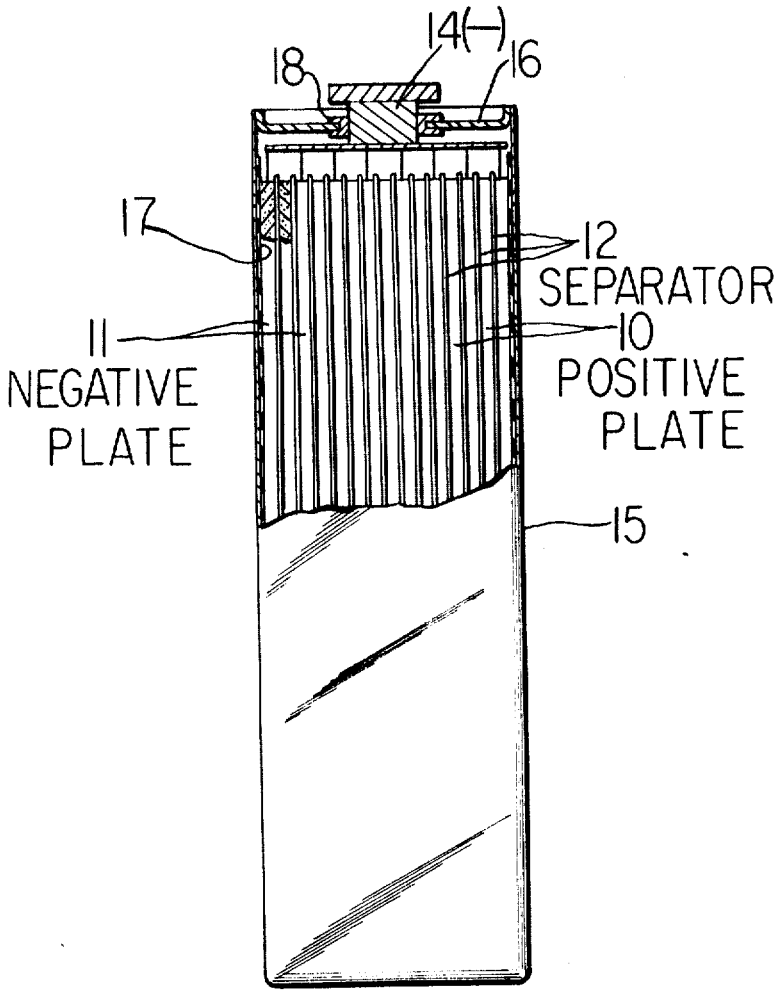
INVENTOR
JEAN-PIERRE LOUIS RODOLPHE HARIVEL
BY Kenyon & Kenyon
ATTORNEYS United States Patent Office Re. 26,660
Reissued Sept. 9, 1969

26,660
SEALED ALKALINE CELLS AND ELECTROLYTES THEREFOR

Jean-Pierre Rodolphe Harivel, Paris, France, assignor to Societe des Accumulateurs Fixes et de Traction (Societe Anonyme), Romainville, France, a French company Original No. 3,342,639, dated Sept. 19, 1967, Ser. No. 380,777, July 7, 1964. Application for reissue Feb. 19, 1968, Ser. No. 719,796
Claims priority, application France, July 8, 1963, 940,759, 940,760
Int. Cl. H01m *35/02, 43/04*
U.S. Cl. 136—6 6 Claims

Matter enclosed in heavy brackets [ ] appears in the original patent but forms no part of this reissue specification; matter printed in italics indicates the additions made by reissue.

*ABSTRACT OF THE DISCLOSURE*

*Secondary alkaline storage cell including a sealed container, positive and negative electrodes with interposed porous separator and distance between electrodes of about 0.1 to 0.3 mm., and including an alkali metal hydroxide electrolyte having at ambient temperature a concentration of at least 1 N to the limit of solubility in water thereof and containing a compound selected from the group consisting of zinc hydroxide and cadmium hydroxide in a concentration sufficient to obtain an electro-deposited metal layer on the cathode for catalyzing the consumption of electrolysis products formed during overcharge and overdischarge without causing precipitation of conductive crystals capable of short circuiting the cell.*

This invention relates to sealed nickel cadmium alkaline storage cells and more especially to improved cells which are capable of withstanding large overcharging currents without developing excessive internal pressures.

Electrolytic cells for certain purposes, such as for use in mines, preferably should be sealed to prevent escape of gases that may be generated in the cell where such escape might create an explosive mixture. Sealed cells are also advantageous in numerous other environments. For example, sealed nickel-cadmium cells have become popular because they may be compact and yet deliver a high energy output. However, the generation of electrolysis products, if not completely consumed, causes a pressure buildup within the cell. It is necessary to limit this pressure buildup to a safe level, and to provide the cell with a casing capable of withstanding the maximum pressure which will be generated in the cell with a safety margin.

Cells which can operate without gas evolution during normal charging or overcharging at low current densities are already known. Given special conditions such cells can also operate without gas evolution during overdischarge, i.e., the passage of current through a completely discharged cell from its negative electrode to its positive electrode. Such current is encountered in cells connected in series when one of the cells is fully discharged before the others. Gas evolution in sealed cells may be avoided in such cells in which the electrodes comprise thin sintered plates impregnated with active materials, located close enough together to prevent electrolysis products from passing through the gaseous phase, at least as long as the current density during overcharge and overdischarge does not exceed a given limit. Under such conditions the oxygen which is formed at the anode, which is the positive electrode during overcharge and the negative electrode during overdischarge, is not evolved in the gaseous state but is diffused in the dissolved state through the electrolyte to the cathode where it is consumed by secondary reactions.

An electrode structure of the general type described above, including electrodes of opposite polarity separated by a permeable or semi-permeable separator a few tenths of a millimeter thick compressed between the electrodes, is described in Jeannin U.S. Patent No. 2,646,455 issued July 21, 1953. A cell of this type can operate without any gas evolution even at substantial overcharging current densities However, if the current density is increased beyond a predetermined limit under unusual operating conditions, gas evolution takes place, and the gas escaping from the electrodes accumulates in the free space in the casing, causing an increase in internal pressure in the cell which may rise to dangerous values.

The permissible overcharge current density should be as high as possible to minimize or eliminate the danger of pressure buildup within the cell. Cells in which the electrodes of opposite polarity are about 0.1 millimeter apart are presently known. This close spacing between electrodes increases the rate of oxygen diffusion between electrodes and thereby increases the permissible overcharged current density. Generally, with presently known separator materials, there is a danger of short-circuiting if electrodes of opposite polarity are closer together than 0.1 millimeter. There is a limit to the permissible overcharging currents even in such cells. The present invention permits saft overcharging at higher current densities and for longer periods of time, thereby minimizing the danger of explosive pressure buildup if the cell is inadvertently overcharged at a high current density for a substantial length of time.

An object of this invention is to provide a sealed alkaline type cell in which the consumption of oxygen generated at the anode is more efficient than in presently known cells.

A further object of this invention is to provide a sealed alkaline type storage cell which is capable of being charged, overcharged and even overdischarged at current densities equal to or greater than the maximum current densities which can be withstood by presently known sealed cells, while generating internal pressures considerably below those generated in presently known cells.

It has now been found that the electrolysis products generated during overcharging and overdischarging of a sealed cell can be recombined without building up undue pressure within the casing, by using as the electrolyte a highly concentrated solution of potassium hydroxide containing dissolved therein a member of the group consisting of zinc hydroxide and cadmium hydroxide in concentration sufficiently great to promote the consumption of said electrolysis products. The terms "zinc hydroxide" and "cadmium hydroxide" herein include zinc oxide and cadmium oxide, respectively.

The electrolyte in cells of the present invention is aqueous potassium hydroxide having a concentration of 11 N or greater, containing a compound selected from the group consisting of zinc hydroxide and cadmium hydroxide dissolved therein. The upper limit of potassium hydroxide concentration is limited only by the solubility of potassium hydroxide in water. Reference to well-known publications such as Chemistry and Physics, p. 2061, 43rd edition, published by the Chemical Rubber Publishing Company, 2310 Superior Ave., NE. Cleveland, Ohio, and to Noveau Traité de Chemie Minerale Pascal, vol II, pp. 51, 52, 53 edited by Masson et Cie, 120 Boulevard Saint Germain, Paris 6, France and vol. V, 1962 edition of the same Treatise, p. 370 indicate clearly that at ambient temperatures the upper limit of solubility in water of potassium hydroxide is 14 N or approximately 52%.

The preferred electrolyte in cells of this invention is potasium hydroxide having a concentration of at least 14 N and containing dissolved cadmium hydroxide in a concentration equivalent to about .002 to about .006 gram atoms of cadmium per liter of electrolyte. The amount must be sufficient to obtain an electrodeposited metal layer on the electrode for catalyzing the consumption of the products of overcharge and overdischarge, and must not be so high as to cause the precipitation of conductive crystals which are capable of short-circuiting the cell. Preferably the concentration hydroxide is at least 400 mg./liter, which corresponds to .00274 gram atoms of cadmium per liter. When cadmium hydroxide is the dissolved hydroxide, the concentration of potassium hydroxide should be at least 14 N so that at least 400 mg./liter of $Cd(OH)_2$ can be dissolved in the electrolyte.

An alternative electrolyte according to this invention is potassium hydroxide having a concentration of at least 11 N and containing dissolved zinc hydroxide. The concentration of zinc hydroxide must be sufficient for it to be electrodeposited as a metal layer and thus to act as a catalyst for consumption of electrolysis products formed on overcharge and overdischarge but not so high as to cause the formation of conductive crystals which are capable of short-circuiting the cell. Zinc hydroxide may be dissolved in a concentration equivalent to about .001 to about .003 gram atoms of zinc per liter.

The electrolyte concentration in potassium hydroxide is chosen such that it permits the dissolution of a sufficient amount of cadmium hydroxide or zinc hydroxide as the case may be.

Thus for cadmium hydroxide the concentration of potassium hydroxide must be at least 14 N whereas for zinc hydroxide which is more soluble a concentration of potassium hydroxide of 11 N is enough.

Potassium hydroxide electrolytes in presently known cells customarily have a density of about 25° to 40° Bé., which corresponds to a KOH concentration not greater than about 10 N.

A cell according to the present invention will be described by way of illustration with reference to the accompanying drawing, in which the sole figure is a perspective view of a cell with parts broken away and parts showr in section.

Referring now to the drawing, the cell comprises a plurality of positive plates 10 alternating with a plurality of negative plates 11, and thin separators 12 between adjacent plates of opposite polarity. Both the positive and the negative plates preferably comprise thin sintered nickel carriers impregnated with a suitable active material. The positive plates contain $Ni(OH)_2$ as the active material, and the negative plates contain $Cd(OH)_2$ as the active material. Such plates are well known in the art. Each electrode plate is not more than 1 mm. thick, and a preferred thickness is about 0.8 mm. The separators 12 in the assembly are in the range of 0.1 to 0.3 mm. thick, and preferably the thickness of the separators does not exceed 0.2 mm. The separators 12 can be made of various woven or felted synthetic materials; a preferred separator material is felted nylon. The separators 12 are compressed between a positive plate 10 and a negative plate 11 so that their ultimate thickness falls within the range specified above. The compression may be in the range of 100 to 300 kg./cm.$^2$.

Electrodes of like polarity (e.g. 11) are connected to a terminal 14. On the figure only the negative terminal is represented. The cell may comprise any desired number of positive plates and any desired number of negative plates. For purposes of illustration, a cell having seven positive plates 10 and eight negative plates 11 is illustrated.

The casing for the cell comprises a nickel plated steel container 15 which forms the bottom and side walls of the cell, nickel plated steel top 16 which is electrically insulated from the terminals (part 18) and soldered to the container. The separator and electrodes block is wrapped in an insulating sheet 17. Various constructions of electrode terminals are known in the art.

The cell contains as its electrolyte a concentrated solution of potassium hydroxide containing dissolved zinc hydroxide or cadmium hydroxide in the concentrations previously indicated. The amount of electrolyte may be either equal to or in excess of the amount needed to completely occupy the pores and capillaries of the active electrodes and the separators. As a matter of fact, excess electrolyte is desirable because it promotes the use of the cell at very high discharge rates.

It is to be understood that the cell illustrated in the accompanying drawing is for purposes of illustration only, and that various structural modifications may be made provided thin sintered electrodes having a spacing not exceeding about 0.3 mm. are used and provided that the electrolyte be as aforedescribed.

Accordingly to one embodiment of the invention cadmium hydroxide is introduced into the electrolyte prior to sealing of the cell by alternately charging and discharging the cell several times. The cell casing in addition to being open is preferably provided with a safety valve which opens at a predetermined pressure to permit the escape of gases generated within the cell. Cadmium hydroxide in the negative electrode is dissolved by this procedure until the concentration reaches the desired level above indicated. The safety valve may be thereafter removed and the casing sealed, there being no necessity for a safety valve during subsequent operation of the cell.

According to another embodiment of this invention at least 400 mg. per liter of cadmium hydroxide is dissolved directly in an electrolyte of potassium hydroxide having a concentration of 14 N or greater, prior to the introduction of this electrolyte into a cell. Zinc hydroxide is also incorporated in a potassium hydroxide electrolyte by direct dissolution of either zinc oxide or zinc hydroxide.

Cells containing as their electrolyte potassium hydroxide having a concentration either of 11 N or greater or of 14 N or greater, and having dissolved therein either zinc hydroxide or cadmium hydroxide respectively in amounts as hereinbefore indicated can be overcharged or overdischarged at current densities up to C/10 *without* the generation of dangerous pressures within the casing. For example, a cell having a rated capacity of 4 ampere hours can be charged and overcharged at a current of 400 ma., and the pressure within the casing will become stabilized at an acceptable pressure. The pressure within the casing will stabilize generally at a value of about 2.5 kg./cm.$^2$. This is in contrast to pressures which may be as high as 10 kg./cm.$^2$ in presently known cells at the same overcharge and overdischarge current densities.

While I do not wish to be bound by any theory of explanation, it is believed that the results obtained by the present invention can be explained by catalytic action of the dissolved zinc hydroxide or cadmium hydroxide in promoting the recombination of electrolysis products, particularly oxygen, generated at the electrodes. The current causes the formation of an essentially porous cadmium deposit on the cathode, i.e., the negative electrode during charging and overcharging and the positive electrode during discharge and overdischarge. The source of this cadmium is the cadmium hydroxide dissolved in the concentrated electrolyte. This cadmium deposit increases the consumption rate of the electrolysis products, presumably by catalytic action, since the magnitude of the effect is too great to be explained by the law of mass action. It has been found that the use of a highly concentrated alkaline electrolyte containing either zinc hydroxide or cadmium hydroxide dissolved therein is an even more efficient means for increasing consumption of oxygen than is a decrease in the distance between oppositely charged electrodes. Of course it is understood that for maximum efficiency the electrodes in the present invention are placed as close together as possible without danger of short-circuiting; this distance is approximately 0.1 mm.

The major advantage of the present invention is that higher overcharge and overdischarge currents may be used than was the case in any sealed cell previously known. A cell of the present invention can be overcharged indefinitely at a current density of C/10 without pressure buildup beyond approximately 2.5 kg./cm.$^2$. Cells previously known could be overcharged at such current densities only for limited times; otherwise pressure within the cell would continue to build up and ultimately reach dangerous levels.

The following examples are given by way of illustrations of this invention:

Example 1

A sealed storage cell was constructed with seven positive plates made of sintered nickel carriers impregnated with $Ni(OH)_2$ as the active material, and eight negative electrodes made from similar sintered nickel carriers and having $Cd(OH)_2$ as the active material. Both positive and negative plates were 56 mm. by 44 mm. by 0.8 mm. thick. Separators made of felted nylon fibers were interposed between the electrodes of opposite polarity, filling entirely the space between said electrodes, which space had a depth of about 0.2 mm. The cell used herein is illustrated in the drawing. This cell was filled with 23 ml. of 14 N potassium hydroxide having dissolved therein 400 mg./liter of cadmium hydroxide (equivalent of .00274 gram atoms of cadmium per liter). The volume of electrolyte necessary to impregnate the capillaries of the electrodes and separator blocks is 13 ml. This cell had a rated capacity of 4 ampere hours. This cell was overcharged for a long period of time at a current of 400 ma. The pressure within the casing stabilized at about 2.5 kg./cm.$^2$. The cell was also overdischarged at a current density of 400 ma. for a considerable length of time. Again the pressure within the cell stabilized at 2.5 kg./cm.$^2$.

Example 2

A cell of the same structure and dimensions as that in Example 1 was constructed, except that this cell had as its electrolyte 23 ml. of 11 N potassium hydroxide to which had been added 100 mg. per liter of ZnO (equivalent to .00123 gram atoms of zinc per liter). This cell had a rated capacity of 4 ampere hours. The cell was overcharged for a considerable length of time, and was then overdischarged for a considerable length of time, both at 400 ma. In both cases the pressure in the casing stabilized at about 2.5 kg./cm.$^2$.

While this invention has been described with reference to specific embodiments thereof, it is understood that these are merely illustrative and are not given by way of limitation.

What is claimed is:

1. In a secondary nickel-cadmium alkaline storage said electrodes, the distance between said electrodes a negative electrode, and a porous separator separating said electrodes, the distance between said electrodes being in the range of about 0.1 to 0.3 mm., the improvement in combination therewith comprising an alkali metal hydroxide electrolyte having at ambient temperature a concentration of from at least 11 N to the limit of solubility in water thereof and containing a compound selected from the group consisting of zinc hydroxide and cadmium hydroxide in a concentration sufficient to obtain an electro-deposited metal layer on the cathode for catalyzing the [dissolution] *consumption* of electrolysis products formed during overcharge and overdischarge without causing precipitation of conductive crystals capable of short-circuiting the cell.

2. The cell of claim 1 wherein said positive electrode has nickel hydroxide as its active material and said negative electrode has cadmium hydroxide as its active material.

3. The cell of claim 1 wherein said electrolyte has a concentration of at least 14 N and contains cadmium hydroxide in a concentration equivalent to .002 to .006 gram atoms of cadmium per liter.

4. The cell of claim 1 wherein said electrolyte contains zinc oxide in a concentration equivalent to about .001 to about .003 gram atoms of zinc per liter.

5. The cell of claim 1 wherein the amount of electrolyte is in excess of the amount required to saturate the electrodes and separator.

6. The cell of claim 1 wherein said positive and negative electrodes are sintered nickel carriers impregnated with active materials which are respectively nickel hydroxide for the positive electrode and cadmium hydroxide for the negative electrode and wherein said alkali metal hydroxide electrolyte is potassium hydroxide.

References Cited

The following references, cited by the Examiner, are of record in the patented file of this patent or the original patent.

UNITED STATES PATENTS

| | | | |
|---|---|---|---|
| 2,905,739 | 9/1959 | Strauss | 136—6 |
| 2,976,341 | 3/1961 | Daley | 136—6 XR |
| 3,174,879 | 3/1965 | Stanimirovitch | 136—6 |
| 3,091,580 | 5/1963 | Shapiro et al. | 204—56 X |

OTHER REFERENCES

Weast: "Handbook of Chemistry and Physics," 46th edition, 1965, p. B–160.

ALLEN B. CURTIS, Primary Examiner

A. SKAPARS, Assistant Examiner

PO-1050
(5/69)

UNITED STATES PATENT OFFICE
CERTIFICATE OF CORRECTION

Patent No. Re 26660 Dated September 9, 1969

Inventor(s) JEAN-PIERRE RODOLPHE HARIVEL

It is certified that error appears in the above-identified patent and that said Letters Patent are hereby corrected as shown below:

Col. 1, line 26 "1N" should read -- 11N --

Col. 2, line 28 "saft" should read -- safe --

Claim 1, col. 6 line 2, delete "said electrodes, the distance between said electrodes" and substitute -- cell comprising a sealed container, a positive electrode, --

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents